United States Patent [19]

Streater

[11] Patent Number: 4,982,175
[45] Date of Patent: Jan. 1, 1991

[54] TELEMETRY CIRCUIT WITH NOISE IMMUNIZATION

[75] Inventor: August L. Streater, Bluffton, Ind.

[73] Assignee: Franklin Electric Co., Inc., Bluffton, Ind.

[21] Appl. No.: 398,538

[22] Filed: Aug. 25, 1989

[51] Int. Cl.$^5$ .......................................... H04M 11/04
[52] U.S. Cl. ........................... 340/310 R; 340/310 A; 340/310 CP; 340/870.01; 370/6; 375/37; 375/99
[58] Field of Search ........ 340/310 R, 310 A, 310 CP, 340/538, 870.19, 870.01, 870.31, 870.4; 370/6; 375/99, 75, 37

[56] References Cited

U.S. PATENT DOCUMENTS

| | | | |
|---|---|---|---|
| 3,594,584 | 7/1971 | Woods | 340/310 A |
| 4,499,062 | 2/1990 | Konrad | 340/310 R |
| 4,914,418 | 4/1990 | Mak et al. | 340/310 A |

*Primary Examiner*—Donnie L. Crosland
*Attorney, Agent, or Firm*—Marshall, O'Toole, Gerstein, Murray & Bicknell

[57] ABSTRACT

A telemetry system for use with AC power lines, comprising a pulse transmitter connected to the lines for generating pulses on the power lines only in a selected portion of each full cycle of the power line voltage waveshape. The system further comprises a pulse receiver including first means for counting pulses in the selected portion and second means for counting pulses in another portion of each full cycle. The two counts are compared (one is subtracted from the other) over a plurality of full cycles to produce a net pulse count. Since the noise signals appear throughout the cycles and, over a sufficient number of full cycles, are present in substantially equal numbers in both portions, the subtraction of the two counts essentially eliminates the noise pulses. Any remaining pulses are those produced by the transmitter and may be processed as needed, and false tripping due to noise signals is avoided.

10 Claims, 3 Drawing Sheets

FIG-1-
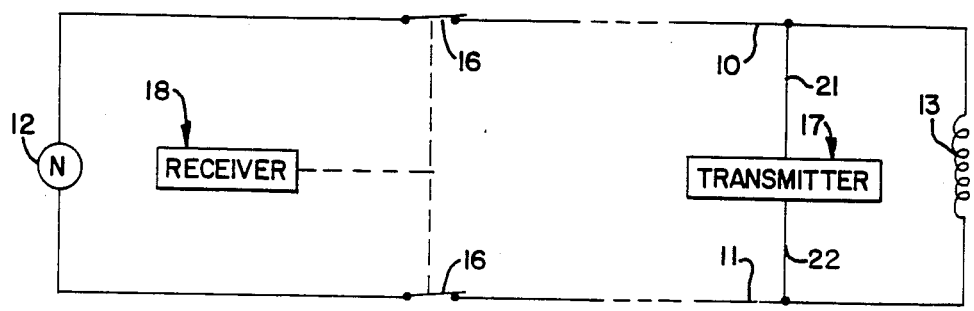
FIG-2-
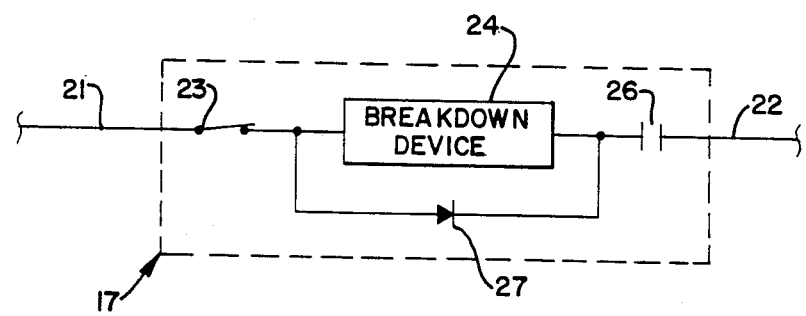
FIG-3-
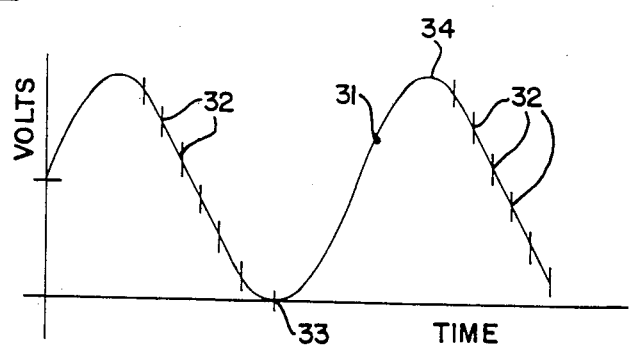

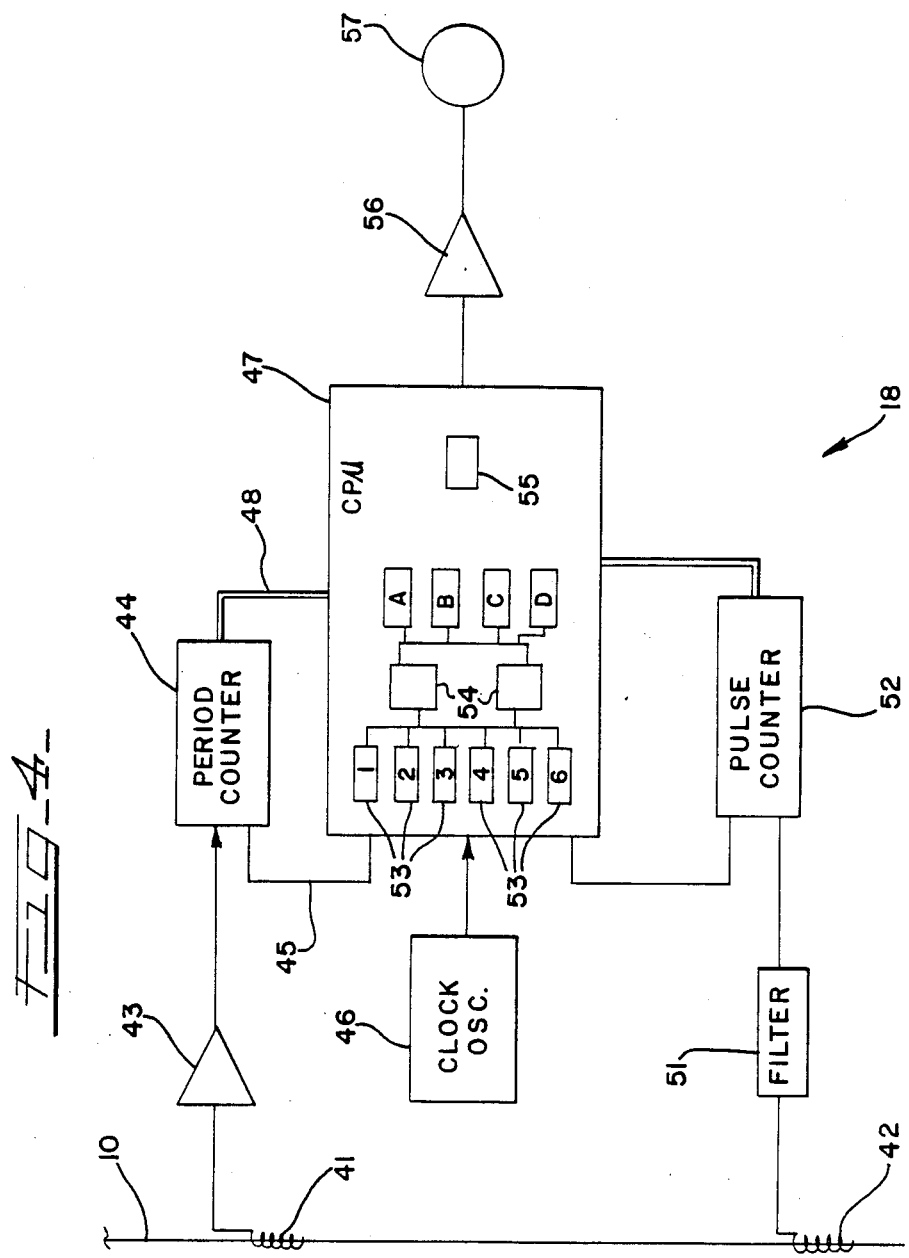

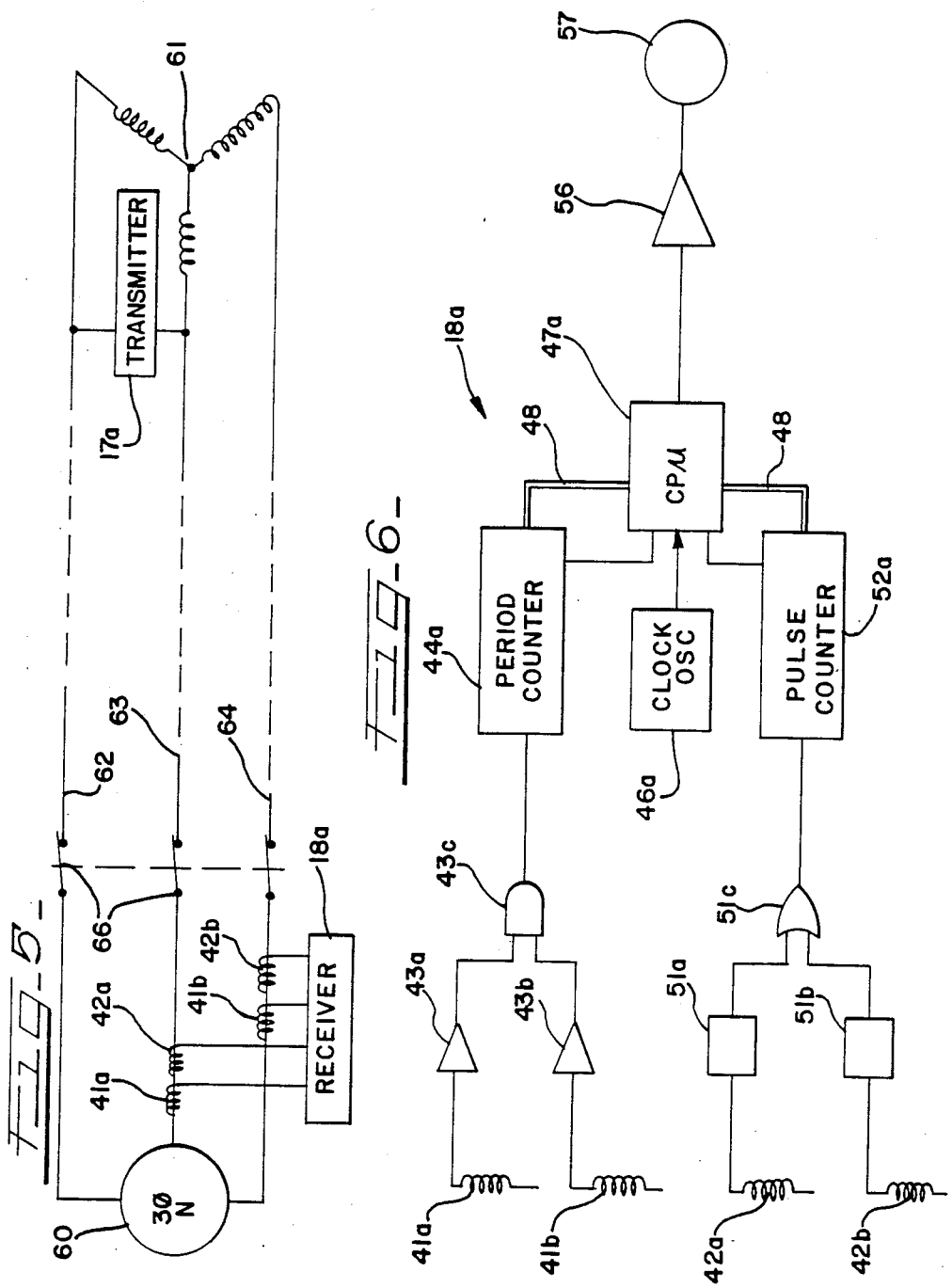

TELEMETRY CIRCUIT WITH NOISE IMMUNIZATION

FIELD AND BACKGROUND OF THE INVENTION

This invention relates to a system for generating and detecting telemetry pulses on electrical conductors, such as power lines.

Telemetry systems have been provided in the past for generating electrical pulses at one location on electrical conductors and for detecting the pulses at another position, in order to convey information between the two locations. For example, the Woods U.S. Pat. No. 3,594,584 and the Woods et al U.S. Pat. No. 3,815,006 show such systems wherein the conductors are power lines between an AC power supply and a load. As an example, the pulse generator or transmitter may be responsive to a condition (such as excessive temperature) of the load and generate pulses when the condition exists, and a pulse receiver or detector may operate a device such as an indicator or a contactor which opens the power lines to an overheated load.

A problem which has been encountered with prior art systems of the foregoing character is that they are susceptible to error caused by noise pulses which frequently appear on the power lines. The receiver has not been able to distinguish between the transmitter pulses and the noise pulses, and as a consequence the system has been subject to false tripping.

There are two general types of noise signals on power lines. One type may be called random noise pulses which appear essentially randomly and continuously. The other type may be referred to as synchronized pulses because they appear in equal numbers and at regular locations in both halves of the line voltage waveshape. The latter type of noise may be produced by SCR motor drives, light dimmers, etc.

It is a general object of the present invention to provide an improved telemetry system which is substantially immune to noise pulses on the power lines.

SUMMARY OF THE INVENTION

A telemetry system in accordance with the present invention is for use with AC power lines, and comprises a pulse transmitter connected to the lines for generating pulses on the power lines only in a selected half-cycle of each full cycle of the power line voltage waveshape. The system further comprises a pulse receiver including first means for counting pulses in the selected half-cycle and second means for counting pulses in the other or remaining half-cycle of each full cycle. The two counts are compared (one is subtracted from the other) over a plurality of full cycles to produce a net pulse count. Since the noise signals appear in both half-cycles and, over a sufficient number of full cycles, are present in substantially equal numbers in the two half-cycles, the subtraction of the two counts essentially eliminates the noise pulses. Any remaining pulses are those produced by the transmitter and may be processed as needed, and false tripping due to noise signals is avoided.

BRIEF DESCRIPTION OF THE DRAWINGS

The invention will be better understood from the following detailed description taken in conjunction with the accompanying figures of the drawings, wherein:

FIG. 1 a schematic diagram of a single phase AC power circuit including a telemetry system in accordance with this invention;

FIG. 2 is a diagram of a transmitter of the system;

FIG. 3 is a diagram of a voltage waveform illustrating the operation of the system;

FIG. 4 is a block diagram of a receiver of the system shown in FIG. 1;

FIG. 5 is a diagram of a 3 phase power circuit including another embodiment of the invention; and FIG. 6 is a diagram of a receiver of the embodiment shown in FIG. 5.

DETAILED DESCRIPTION OF THE DRAWINGS

With reference first to FIG. 1, the circuit includes two power lines 10 and 11 which connect an AC power supply 12 to an AC load 13. The power supply 12 may comprise, for example, an AC generator or a power distribution transformer, and the load 13 may comprise a winding of an AC motor. A power contactor 16 is connected in the lines 10 and 11 in order to control the power flow to the load 13. Connected to the lines 10 and 11 adjacent the load 13 is a transmitter 17, and connected to at least one of the lines 10 and 11 adjacent the contactor 16 is a receiver 18. During the operation of the circuit shown in FIG. 1, when the contactors 16 are closed, AC power flows from the supply 12 to the load 13. Under preset circumstances, the transmitter 17 generates pulses which are superimposed on the AC waveform, and the receiver 18 detects the pulses. The pulses generated by the transmitter 17 may, for example, indicate an overheated condition of the load 13 and, in these circumstances the receiver 18 responds to the presence of the pulses and opens the contactors 16 in order to disconnect the power supply 12 from the load 13.

With reference to FIG. 2, the transmitter 17 may be a type shown in Woods U.S. Pat. No. 3,594,584 and is connected across the two power lines 10 and 11 by two conductors 21 and 22. A switch 23, a breakdown device 24 and a capacitor 26 are connected in series between the two conductors 21 and 22. In addition, means is provided for confining any telemetry pulses to only one-half cycle of each full power frequency cycle. In this example, a diode 27 is connected in parallel with the breakdown device 24.

The switch 23 may be constructed to respond to a selected condition of the load 13. For example, the switch 23 may be a heat-responsive bimetal switch which is mounted closely adjacent the load 13 so that it responds to the temperature of the load. The switch 23 may be open when the load 13 is operating near the rated temperature level and closed only when the temperature of the load 13 rises above a predetermined level. When the switch 23 closes, the AC voltage waveform 31 (see FIG. 3) present across the power lines 10 and 11 also appears across the breakdown device 24 and the capacitor 26. As described in detail in the previously mentioned U.S. Pat. No. 3,594,584, in these circumstances the breakdown device 24 periodically conducts and the transmitter 17 generates a series of pulses 32 which are superimposed on the waveform 31. The presence of the diode 27 causes the pulses 32 to appear only in one-half of each of the full cycles of the voltage waveform 31. In the example illustrated, when the diode 27 conducts (during the rising half cycle from the negative crest 33 to the positive crest 34), it prevents a voltage from building up across the breakdown device 24 and therefore no pulses are generated. On the other hand, on the decreasing half cycle of the waveform (from the positive crest 34 down to the next adjacent negative crest 33), the diode 27 is biased off and the breakdown device 24 cooperates with the capacitor 26 to generate telemetry pulses 32.

With reference to FIG. 4, the receiver 18 for use in a single phase system includes a current sensor 41 and a pulse sensor 42, each of which may comprise a current sensing coil around one of the power lines 10 and 11. The current sensor 41 produces a power frequency sine wave signal such as the waveform 31 in FIG. 3, which is fed to an amplifier wave shaping circuit 43. The wave shaping portion of the circuit 43 may include a comparator which produces a square wave that is synchronized with the sine wave. For example, the square wave may be positive during the positive half cycle of the current sine wave. A period counter 44 receives the square wave signal and it also receives pulses from a clock oscillator 46 on a line 45. The counter 44 counts clock pulses from the rising edge of each square wave to the next rising edge, and the counter 44 is reset and its count is passed to a cpu (central processing unit) 47 on a buss 48 at the beginning of each square wave. Consequently the count indicates the length of each square wave, which, of course, is also the length of the sine wave 31.

As previously mentioned and as shown in FIG. 3, the transmitter 17 pulses 32 are synchronized with respect to the voltage waveform 31. The sensor 41 responds to the current which may be out of phase with the voltage and therefore the pulses 32 may not have the same relationship to the current waveform. However, the pulse processing arrangement described as follows does not require that the pulses 32 fall on a certain portion of the current waveform.

The signal from the sensor 42 is fed to a filter 51 that passes only the pulses to a pulse counter 52 which counts all pulses received from the sensor 42, both noise pulses and the pulses 32. The cpu 47 is programmed to divide each cycle of the current waveform (the overall time being indicated by the period counter 44) into a plurality of time segments. In the present example, each cycle is divided into six equal segments, and this may be accomplished in the cpu 47 simply by dividing the cycle count from the counter 44 into six equal parts. At the end of each of the six parts or segments, the cpu 47 reads the count in the pulse counter 52 and resets the counter 52 to zero. Therefore, for each cycle of the current, the cpu 47 receives six pulse counts which may be referred to as count 1, count 2, ... count 6.

Each waveform cycle which is divided into segments by the cpu is based on the length of the immediately preceding cycle received by the counter 44. Since the lengths of power frequency cycles may vary, the present arrangement is advantageous because an adjustment in the cycle or period count may be made at the end of each cycle.

The six counts received by the cpu 47 in each cycle are momentarily stored in six counters indicated by the numeral 53; the number of pulses in counts 1, 2 and 3 are totaled, and a separate total is made of the pulses in counts 4, 5 and 6. Summation units 54 make the totals and comparisons. If the total number of pulses in counts 1, 2 and 3 is greater than the total number of pulses in counts 4, 5 and 6, then a register A is upcounted by one. On the other hand, if the total number of pulses in the counts 4, 5 and 6 is greater than the total number of pulses in the counts 1, 2 and 3, then a second register B is upcounted by one.

At the same time, a separate total is made of counts 3, 4 and 5 and compared with the total of the counts 1, 2 and 6. If the total of the counts 3, 4 and 5 is greater than the total of the counts 1, 2 and 6, a third register C is upcounted by one, but if the total of counts 1, 2 and 6 is greater than the total of counts 3, 4 and 5, a fourth register D is upcounted by one. Each of the six counts or segments cover onesixth of the waveform or 60°. Consequently the counts 3, 4 and 5 are offset by 120° from the counts 1, 2 and 3, and the counts 1, 2 and 6 are offset by 120° from the counts 4, 5 and 6.

The foregoing counts, comparisons and upcounts are repeated in each cycle for a preset number of power cycles. The cpu 47 counts the power cycles and forms a time base or trip determination period. At the end of each trip determination period, which in this specific example is 120 cycles (two seconds with 60 Hz power), the cpu 47 operates to read or interrogate the four registers A, B, C and D. If the count in any one of the four registers is greater than a preset number, a trip circuit 55 is actuated. Further, at the end of each trip determination period the components 53 to 55 and the registers A, B, C and D are reset to zero.

If the preset number is present in one of the registers A, B, C or D at the end of the trip determination period, a trip signal is generated by the trip circuit 55 and fed to a buffer-amplifier 56 which operates a control 57 for the contactors 16.

As previously mentioned, the transmitter 17 operates, when it is actuated by a selected condition of the load 13, to generate pulses on the power lines 10 and 11, the pulses being present in only one-half of each cycle of the AC voltage. The receiver 18 detects all pulses on the power lines including the noise pulses. However, the comparison or subtraction process described above whereby the counts in the counters 53 are compared and two of the registers A, B, C and D are upcounted by one in each cycle, results in that the noise pulses are subtracted out and only the transmitter pulses 32 remain. Further, it can be shown that most, if not all, of the transmitter pulses will fall in one of the groups of counts described above; in other words, by reason of the 120° offset of the counts associated with the registers C and D relative to those associated with the registers A and B, most or all of the transmitter pulses will fall either in the group of counts 1, 2 and 3, or in the group of counts 4, 5 and 6, or in the group of counts 3, 4 and 5, or in the group of counts 1, 2 and 6. As a consequence, one of the four registers A, B, C and D will be upcounted by one in each cycle when the pulses 32 are present, and the trip 55 will be actuated at the end of a trip determination period when the transmitter 17 is actuated.

FIGS. 5 and 6 illustrate a system for use with a three-phase power supply and load. The three-phase system includes a 3 phase supply 60, a load 61 and three power lines 62, 63 and 64. Contactors 66 are connected in the power lines. A transmitter 17a is connected to two of the three lines 62–64, and a receiver 8a is connected to two of the three lines. The receiver shown in FIG. 6 does not require that the transmitter and the receiver be connected to the same two power lines. The receiver 18a includes two current sensors 41a and 41b which are coupled to two of the three power lines, and the current waveforms from the two sensors 41a and 41b are fed through two wave shaping circuits 43a and 43b to a logic AND circuit 43c. In operation, the circuits 43a and 43b produce square wave signals, and during a short part of each AC power cycle, the outputs of both circuits 43a and 43b are positive. During this positive portion the output of the AND circuit 43c is also positive. The period counter 44a is triggered by the rising edge of each square wave signal from the circuit 43c, and thus is triggered once in each AC power cycle.

Two pulse sensors 42a and 42b are also coupled to two of the three power lines. The sensor outputs are passed through filters 51a and 51b and through a logic OR circuit 51c to a pulse counter 52a. Thus, all of the pulses from the two sensors are fed to the pulse counter 52a. By this arrangement, it is not necessary that the pulse sensors 42a and 42b be coupled to the same two power lines as the transmitter 17a because the two sensors will pick up the transmitter pulses regardless of the location of the transmitter. The remainder of the components and their operation are similar to that of the system shown in FIG. 4.

It will be apparent from the foregoing that a novel and useful system has been provided. The pulses from the transmitter (assuming that the transmitter has been activated) are confined to one-half of each power frequency cycle. The receiver separates each cycle into adjacent parts with the transmitter pulses located in one of the parts. In each cycle, separate counts are made of the pulses in each part and then one count is subtracted from the other. The noise pulses are thus cancelled out leaving essentially only the transmitter pulses, which are utilized to trigger or actuate a device such as a control for contactors. If the transmitter has not been activated and no transmitter pulses are present, the noise pulses are cancelled out and the device is not actuated.

More specifically, the system operates as follows:

1. Transmitted pulses from the pulse transmitter are confined to a single half-cycle of each power frequency cycle.

2. At the receiver, two adjacent half-cycle time bases are selected in relation to the line voltage waveshape such that one of the half-cycle intervals will contain most, if not all, of the transmitted pulses.

3. The pulses are counted separately for each time base in each cycle, and a register is upcounted for each cycle, in which the number of pulses counted during the half-cycle that will contain most of the transmitted pulses, exceeds the number of pulses counted in the other, adjacent half-cycle.

4. At the end of a trip determination period of N cycles, a trip signal is issued if the register accumulation exceeds some predetermined number Na (which is preferably something significantly more than half of the number of cycles in the trip determination period).

5. If no trip is called for, the register is reset to zero and the counting process is repeated for another N cycles.

The number of cycles N in the trip determination period should be a significant number such as thirty or more cycles, and the number of cycles Na required to produce a trip should be at least 70% of N.

As previously mentioned there are two general types of noise which may cause false trips in a telemetry system. In one type the noise pulses are synchronized with the AC waveform and appear on both halves of each cycle. Consequently the count of such noise pulses in one-half cycle equals the count in the other half, and therefore a trip determination may be made after only a few cycles of the power frequency.

The other noise type is random noise which appears randomly throughout each cycle. In each cycle, the count of random noise pulses in one half cycle will likely be greater than the count in the other half cycle, and therefore, if only random noise pulses are present, one of a pair of registers will be upcounted at the end of each cycle. However, the probability is that over a sufficient number of cycles, the counts in the two cycle halves will be essentially equal, and with a sufficiently high trip count N, the probability of a false trip due to random noise can be shown to be small. As a general rule, by making the trip determination period N longer, the trip count Na, as a fraction of N, may be made smaller. Essentially comparable performance for random noise may be achieved for Na/N of 0.85 at N=60; for Na/N of 0.79 at N=90; and for Na/N of 0.75 at N=120. From the foregoing it will be apparent that a relatively long trip determination period N is preferred; satisfactory results are obtained when N is at least 30 cycles and Na/N is at least 70% as previously mentioned.

It will also be apparent that the invention also includes variations of the foregoing described systems. For example, with reference to FIG. 4, each cycle could be divided into four segments instead of six, in which case four counters and two registers would be utilized in the cpu. Further, if one knew, such as by a prior test, which half cycle (referred to herein as the selected half cycle) contains all of the transmitter pulses, only one accumulating register would be needed. In this instance a count would be made of the pulses in each of the adjacent half cycles of each cycle, and the single register would be upcounted each time that the number of pulses contained in the selected half cycle exceeds the number of pulses in the adjacent non-selected half pulse. A trip would then be made when the number of pulses accumulated in the register exceeds the trip number during a trip determination period. Other forms of transmitters could also be provided. For example, a transmitter could be connected across two power lines and detect a zero crossing of the line voltage. After a 90° delay, pulses could be generated for one-half cycle of each full cycle. Still further, the foregoing described receivers utilize current sensors coupled to the power lines, and current sensors are employed because of the ease with which they may be connected to the power lines. If a voltage waveform sensor were used, two counters and a single register as described above could be used in the receiver.

In the system shown in the drawings, a trip signal is called for if the accumulation in either one of a pair of accumulating registers exceeds a trip constant, Na. In another modification, a trip signal may be called for if the difference in the accumulations of a pair of the accumulating registers exceeds some trip constant, M. The results are identical and the constant M is equal to (2Na−N).

What is claimed is:

1. A receiver for detecting telemetry pulses appearing on power lines connecting an AC supply with an AC load, the lines having a power frequency cycle and possibly noise pulses thereon, the telemetry pulses appearing in only a selected one-half of a power frequency cycle, said receiver comprising a pulse detector adapted to be coupled to at least one of the power lines and detecting pulses in each power cycle, counter means connected to said pulse detector and making a first count of pulses appearing in said selected onehalf of the cycle and a second count of pulses appearing in the remaining one-half of the cycle, and comparison means for subtracting one of the first and second counts from the other of the first and second counts, whereby said noise pulses are substantially removed and a count is made of any telemetry pulses.

2. A receiver for use in an AC power system including an AC supply, a load, power lines connecting the supply with the load, and a pulse transmitter connected to the lines for generating telemetry pulses on the lines, the lines also carrying noise pulses, the telemetry pulses appearing in only one-half cycle of each power cycle and the noise pulses appearing in both half cycles of each power cycle, said receiver comprising a pulse sensor adapted to be coupled to at least one of the power lines and detect any noise pulses and any telemetry pulses thereon, counter means connected to said sensor for making a first count of pulses contained in the half cycle including any telemetry pulses and for making a second count of pulses contained in the remaining half cycle, and means for subtracting said second count from said first count and thereby substantially eliminating said noise pulses.

3. A receiver for use in an AC power system including an AC supply, a load, power lines connecting the supply with the load, and a pulse transmitter connected to the lines for generating telemetry pulses on the lines, the lines also carrying noise pulses, the telemetry pulses appearing in only one-half cycle of each power cycle and the noise pulses appearing in both half cycles of each power cycle, said receiver comprising a pulse sensor adapted to be coupled to at least one of the power lines and detect any noise pulses and any telemetry pulses thereon, time base means forming a time base which encompasses a plurality of the power cycles, counter means connected to said sensor for making a first count of pulses contained in the half cycle including any telemetry pulses over said time base and for making a second count of pulses contained in the remaining half cycle over said time base, and means for comparing said first and second counts over said time base.

4. A receiver according to claim 3, wherein said time base means is coupled to one of said power lines and includes means for counting the power cycles to form said time base.

5. A receiver according to claim 3, and further including at least one register connected to said comparing means and upcounting in each cycle when said first count is greater than said second count, and trip means connected to said register and responsive to a condition where the count in said register is greater than a predetermined number at the end of said time base.

6. A receiver for use in an AC power system carrying AC power cycles, a pulse transmitter being connected to the system for generating telemetry pulses in a portion of at least some of said cycles, said receiver comprising detector means adapted to be coupled to the power system and detect any telemetry and any noise pulses thereon, first means connected to said detector means and counting the number of said detector pulses in said portions of said power cycles over a plurality of power cycles, second means connected to said detector means and counting the number of said detector pulses in another portion of said power cycles over said plurality of power cycles, and third means responsive to said first and second means and determining any difference in the counts.

7. A receiver for use in an AC power system including an AC supply, a load, power lines connecting the supply with the load, and a pulse transmitter connected to the lines for generating telemetry pulses on the lines, the lines also carrying noise pulses, the telemetry pulses appearing in only one-half cycle of each power cycle and the noise pulses appearing in both half cycles of each power cycle, said receiver comprising a pulse sensor adapted to be coupled to at least one of the power lines and detect any noise pulses and any telemetry pulses thereon, a cycle sensor adapted to be coupled to at least one of the power lines and detect the power cycles, time base means connected to said cycle sensor for counting a predetermined number of said power cycles and thereby form a time base, first means responsive to said power cycles for dividing each power cycle into a plurality of segments, counter means responsive to said pulse sensor and to said first means for counting in each cycle the number of pulses occurring in each of said segments, comparison means for subtracting the count of pulses of one segment from the count of pulses of another segment, register means responsive to said comparison means and being upcounted in each cycle when one count is greater than another count, and trip means responsive to said time base means and to said register means and being actuated when the register count at the end of said time means is at a preset number.

8. A receiver as set forth in claim 7, wherein said first means divides each power cycle into at least four segments, said counter means forming separate counts of the pulses in a plurality of sets of said segments, and said comparison means subtracting the pulses of one set from another set.

9. A receiver as set forth in claim 8, wherein the segments of one of said sets is phase displaced from the segments of another of said sets.

10. A receiver as set forth in claim 8, wherein six segments are formed, and four sets of said six segments are formed, two of said sets being phase displaced from the remaining two of said sets.

* * * * *